(12) United States Patent
Imamura

(10) Patent No.: US 6,482,367 B1
(45) Date of Patent: *Nov. 19, 2002

(54) METHOD AND APPARATUS FOR REMOVING HARMFUL COMPONENTS IN AN EXHAUST GAS

(75) Inventor: Hiroshi Imamura, Suita (JP)

(73) Assignee: Kanken Techno Co., Ltd., Suita (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/620,557

(22) Filed: Jul. 20, 2000

Related U.S. Application Data

(63) Continuation-in-part of application No. 09/174,452, filed on Oct. 19, 1998, now Pat. No. 6,126,906.

(30) Foreign Application Priority Data

Jun. 18, 1998 (JP) .......................................... 10-170899

(51) Int. Cl.⁷ .......................... B01D 53/68; B01D 53/34
(52) U.S. Cl. ...................... 422/173; 422/170; 422/171; 422/172; 422/174; 422/182
(58) Field of Search ................ 422/168–172, 422/173, 182, 174

(56) References Cited

U.S. PATENT DOCUMENTS 3,615,163 A   10/1971   Brzozowski ............ 423/240 R
4,125,593 A   11/1978   Scheifley et al. ........... 588/213
4,209,496 A   6/1980    Carpenter et al. ....... 423/240 R
4,874,587 A   10/1989   Galloway .................... 422/189
5,649,985 A   7/1997    Imamura ..................... 422/174
5,716,428 A   2/1998    Imamura ...................... 95/225
5,955,037 A   9/1999    Holst et al. ................. 422/171
6,126,906 A * 10/2000   Imamura ..................... 422/170

* cited by examiner

Primary Examiner—Hien Tran
(74) Attorney, Agent, or Firm—Oblon, Spivak, McClelland, Maier & Neustadt, P.C.

(57) ABSTRACT

Apparatus for removing harmful components of a perfluorocarbon gas or a perfluorocompound. The apparatus includes a first water scrubber for washing an exhaust gas containing a perfluorocarbon or a perfluorocompound discharged from a manufacturing equipment. The apparatus further includes a gas decomposer-burner tower having a gas decomposer room connected to an upper end of the first water scrubber for mixing at least one of a hydrocarbon gas and $NH_3$ gas with the exhaust gas washed by the first water scrubber and thermally decomposing a resulting mixed gas. The apparatus further includes a burner room, a heater below the heater in the gas decomposer room and the burner room, a grating below the heater in the gas decomposer room and the burner room. The apparatus further includes a pipe for supplying a reducing atmosphere forming agent to the gas decomposer room, an air-feeding pipe for supplying air to the burner room, a second water scrubber connected to a lower end of the burner room, and a water cistern on which the first and second scrubbers stand.

7 Claims, 8 Drawing Sheets

METHOD AND APPARATUS FOR REMOVING HARMFUL COMPONENTS IN AN EXHAUST GAS

This application is a Continuation-in-part (CIP) of application Ser. No. 09/174,452 filed on Oct. 19, 1998, now U.S. Pat. No. 6,126,906.

BACKGROUND OF THE INVENTION

1. Field of the Invention

The present invention relates to a method and an apparatus for removing harmful components in an exhaust gas derived during manufacturing an electronic circuit element such as a semiconductor device or a liquid crystal device, particularly during a cleaning or etching process. Further, the present invention relates to an apparatus that is applicable to remove harmful components in a gas generated during the process of smelting aluminum.

2. Description of the Prior Art

In a semiconductor manufacturing apparatus such as a CVD apparatus, a gas for deposition (such as $SiH_4$, $Si_2H_6$, $SiH_2Cl_2$, TEOS, $PH_3$, $B_2H_6$, $NH_3$, $N_2O$, or the like) is used in forming various thin films, and a cleaning gas (such as $NF_3$, $C_2F_6$, $CF_4$, $SF_6$, or the like) is usually used for cleaning the inside of the semiconductor manufacturing apparatus after completing the deposition process.

These gases inherently have various dangerous factors such as flammability, explosiveness, corrosiveness, poisonousness, and the like. Therefore, it is required to remove(detoxify) harmful components in these gases using a harm-removing apparatus equipped, for example, with a means for oxidizing and heating the gases before they are released into atmospheric air.

In the semiconductor manufacturing apparatus such as a CVD apparatus, complex decomposition reactions occur in the gases that are being used, so that new decomposition products (such as $F_2$, HF, and SiOx) are generated as a result and these decomposition products are discharged together with the undecomposed deposit gas and the cleaning gas.

In the semiconductor manufacturing process, a semiconductor manufacturing apparatus such as a CVD apparatus generally operates as follows: deposition using a deposition gas such as $SiH_4$ (toxic to a human body and explosive) →purging of residual $SiH_4$ gas from the CVD chamber using nitrogen→cleaning the CVD chamber using a cleaning gas such as $C_2F_6$ (harmless to a human body though exhibiting a greenhouse effect)→purging of the cleaning gas from the CVD chamber using nitrogen→repeating this cycle.

Here, one group of said gases to be used for cleaning of a CVD chamber is what is known as PFC gases. PFC is an abbreviation for "perfluorocarbon" or "perfluoride compound". Representative examples of PFC are $CF_4$, $CHF_3$, and said $C_2F_6$. If the term "compound" is used instead of "carbon", PFC will further include fluorine compounds that do not contain carbon, such as $NF_3$, $SF_6$, and $SF_4$.

The purpose of the present invention is to establish a technique for removal of the former PFC gases, which technique has not yet reached an applicable level for use in a removal device or a removal method. Naturally, however, the technique of the present invention is also applicable for removal of all the PFC gases including the latter PFC gases.

The PFC gases as represented by $CF_4$ and $C_2F_6$ are non-flammable and toxicity of the gases themselves on human beings is unknown. At least, acute and subacute toxicities are not known. However, since the compounds themselves are stable, they remain unchanged and stay for a long period of time if they are released to an ambient atmosphere. It is reported that the life span until consumption in the atmosphere is 50,000 years in the case of $CF_4$, and 10,000 years in the case of $C_2F_6$.

Further, the global warming factor (relative to $CO_2$) is 4,400 in the case of $CF_4$ and 6,200 in the case of $C_2F_6$ (after 20 years have passed), which involves a problem that cannot be left aside in considering the earth environment. Therefore, it is eagerly desired to establish a means for removing the PFC gases as represented by $CF_4$ and $C_2F_6$.

However, the former PFC gases, i.e. the compounds as represented by $CF_4$, $CHF_3$, and $C_2F_6$, have a stable C—F bond (having a bonding energy as large as 130 kcal/mol) and are not easily decomposed, so that it is extremely difficult to remove them by simple thermal oxidation decomposition.

For example, in the case of $C_2F_6$, the decomposition proceeds by a cut in the C—C bond, so that $C_2F_6$, can be removed by limiting the processing flow rate to be less than 250 liters/min at a processing temperature of 1000° C. However, in the case of $CF_4$, it is necessary to cut the C—F bond that has the largest bonding energy, so that a temperature of 1400° C. is required even with the above-mentioned flow rate. In addition, even by the above method, it is difficult to remove more than 80% of the total gas.

Further, if an electric heater is to be used, attainment of a high temperature atmosphere of more than 1400° C. is an upper limit also from the view point of materials for the heater, so that a long-term usage is almost impossible. Moreover, maintaining the temperature of the entire apparatus is also difficult and, in combination with a thermal insulating material, the total volume of the apparatus will be large and it will not be a compact apparatus. What is more important is that the thermal energy cost will be excessively high.

Here, in this field, the following new method has been proposed. International Publication Number WO94/05399#Method of Decomposing Gaseous Halocarbon# reports that coexistence of $O_2$ makes it possible to decompose and remove, for example, $CF_4$ at a temperature of 600 to 700° C. However, a detailed follow-up experiment of the contents of the publication turned out to be a complete failure in removal under this condition.

Also, an attempt is made to positively introduce $H_2$ gas to pyrolyze PFC. However, it requires a high processing temperature and, besides, it may not be suitable for use from the view point of safety, since the $H_2$ gas is flammable and explosive.

SUMMARY OF THE INVENTION

The present invention is intended to develop a harm-removing apparatus capable of decomposing and removing PFC components at a high removal ratio at a temperature as low as possible (with thermal energy consumed at an amount as small as possible). In other words, the present invention provides a method and an apparatus for removing PFC components at a low temperature, removing the derived fluorine components by separately washing or fixing them, and releasing the other components into the atmospheric air basically as $CO_2$ and $H_2O$. The essence of a PFC removing method according to the present invention is bellow:

The method of the present invention mixes at least one of a hydrocarbon gas and $NH_3$ gas with an exhaust gas containing a perfluorocarbon or a perfluorocompound and thermally decomposes the mixed gas in a non-oxidizing atmosphere at a temperature (600–1300° C.) lower than the temperature at which the conventional apparatus and method performs thermal decomposition.

The term "non-oxidizing atmosphere" herein used will be described later in detail, but means, in a word, an atmosphere free of oxygen in decomposing of the exhaust gas.

When the exhaust gas is washed with water prior to the thermal decomposition, it is possible not only to remove soluble components, dust and the like in the exhaust gas as discharged from manufacturing equipment prior to the thermal decomposition but also to allow the exhaust gas to be incorporated with water content so as to cause the perfluorocarbon or perfluorocompound contained in the exhaust gas to be thermally hydrolyzed.

Where the hydrocarbon gas is mixed excessively, the gas thermally decomposed comes to contain unreacted hydrocarbon gas and soot resulting from the decomposition reaction. Such unreacted hydrocarbon gas and the soot are removed by burning in the next step. Therefore, the term "flammable components" used herein is meant to include an excess of the hydrocarbon gas and soot.

For instance, in the case of thermal decomposition of $CF_4$ and $C_2F_6$ using $C_3H_8$ in a non-oxidizing atmosphere, the decomposition proceeds as follows:

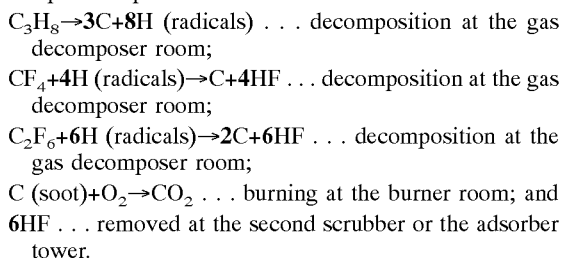

$C_3H_8 \rightarrow 3C+8H$ (radicals) . . . decomposition at the gas decomposer room;

$CF_4+4H$ (radicals)$\rightarrow C+4HF$ . . . decomposition at the gas decomposer room;

$C_2F_6+6H$ (radicals)$\rightarrow 2C+6HF$ . . . decomposition at the gas decomposer room;

$C$ (soot)$+O_2 \rightarrow CO_2$ . . . burning at the burner room; and $6HF$ . . . removed at the second scrubber or the adsorber tower.

Further, any fluorine compound resulting from the thermal decomposition is removed by washing with water or chemical adsorption. Such washing or chemical adsorption process may be performed prior to the burning process, or vice versa.

Major unit operations in the invention are the following three steps.

(a) Thermal decomposition of PFC (b) Exhaustion by washing or removal by fixing of the generated fluorine compounds (c) Removal by burning of other flammable components An important feature of the present invention is the thermal decomposition of PFC of the above step (a) and aims at establishing a technique for processing a gas at a PFC removal ratio of 90% or more in a temperature region (600~1200° C.) considerably lower than the atmosphere temperature required for an ordinary simple thermal decomposition. The PFC removal ratio is calculated as $(A-B) \div A \times 100$, where A and B represent the PFC concentration in the gas introduced into the removing apparatus and the PFC concentration in the released gas, respectively. When the thermal decomposing temperature is at under 600° C. a PFC removal ratio goes down to 20~30%, which is not suitable for use. On the other hand at more than 1200° C., consumption of heat energy needs so much that the heater is impossible to be continuously used for a long period of time. It is like to get a higher thermal decomposing temperature with perfluorocarbon and a lower temperature with perfluoride compound.

The thermal decomposition of PFC that forms an essence of the present invention may employ an electric heater as a heat source or a burner using a liquid fuel such as LPG (Liquefied Petroleum Gas) or LNG (Liquefied Natural Gas) or a gaseous fuel such as $CH_4$, $H_2$, or $CO$ as a heat source. The heat source for heating the gas to be processed is positioned at the gas decomposer room. The electric heater to be used as the heat source may be disposed outside of the gas decomposer room for heating the gas decomposer room from outside or may be disposed inside of the gas decomposer room 12, 22 for directly heating and decomposing the introduced exhaust gas containing PFC. If the liquid fuel or the gaseous fuel is to be used as the heat source, the gas decomposer room is heated from outside only.

Into a space within the gas decomposer room, a mixed gas containing PFC as a major component and typically $N_2$ as a carrier gas is introduced, and further at least one of saturated or unsaturated $C_1$–$C_8$ hydrocarbon gas and $NH_3$ gas in a gaseous state is simultaneously supplied. In this case, if an $O_2$ gas or an $O_3$ gas is used in combination in the semiconductor manufacturing apparatus, the remaining $O_2$, $O_3$ gas flows as an exhaust gas into the gas decomposer room. However, besides the above remaining $O_2$ or $O_3$ gas, neither an $O_2$, $O_3$ gas nor an external air is intentionally introduced into the gas decomposer room. Therefore, one of the essential conditions in the present invention is that at least the inside of the gas decomposer room is not an oxidizing atmosphere. This state is hereafter referred to as "absence of separated $O_2$ or $O_3$". In other wards, separated $O_2$ or $O_3$ refers to what are left in an exhaust gas without consuming depend on the reaction in the semiconductor manufacturing apparatus.

Under this condition, PFC is decomposed by appropriately adjusting the PFC concentration in the gas to be processed, the flow rate of the gas to be processed, and the spatial temperature in the gas decomposer room. In this case, the hydrocarbon introduced as an agent for decomposing PFC is thermally decomposed in a non-oxidizing atmosphere. For example, if propane is used, various decomposition products such as methane, ethane, ethylene, and propylene are generated, and it has been found out that the fluorine components are isolated as $F_2$ or HF due to the interaction between one of the above decomposition products and PFC.

Also, it has been confirmed that the PFC can be almost completely removed even if the temperature of the atmosphere is lower by several hundred degrees than the temperature in processing PFC alone or in an oxidizing atmosphere system.

Without introducing the hydrocarbon agent, it is extremely difficult to attain 80% or more of the PFC removal ratio in processing PFC alone or in an oxidizing atmosphere system even if a high temperature region, which is near the upper limit for the material to be used, is employed. This shows that the mechanism of decomposition of the compounds without introducing the hydrocarbon agent in the gas decomposer room is completely different from that of the present invention.

The processed gas discharged from the gas decomposer room according to the present invention contains $F_2$ or HF gas, a gas generated by decomposition of the hydrocarbon as the decomposing agent, and possibly carbon soot depending on the processing condition.

In the present invention, a fluorine-based exhaust gas and a flammable gas are respectively subjected to harm-removal processes by introducing the two components into separate processing towers in series.

Namely, the former (fluorine-based exhaust gas) is separated and discharged out of the system either by allowing it to be absorbed and dissolved in water by passing it through the second water scrubber or by allowing it to be chemically adsorbed onto a solid adsorbing agent of CaO or $CaCO_3$. The latter (flammable gas) is burnt in the presence of external air and the processed final gas is released into atmospheric air.

These, and other objects and advantages of the present invention will become more evident to those skilled in the art from a consideration of the following detailed description of the preferred embodiment, particularly when read in conjunction with the appended drawings, a brief description of which now follows.

DETAILED DESCRIPTION OF THE PREFERRED EMBODIMENTS

Hereafter, the present invention will be explained with reference to gas removal used in a cleaning or etching process in manufacturing electronic circuit elements. However, the present invention is applicable to removal of a gas generated in smelting aluminum.

The PFC removing apparatus of the present invention integrally accommodates, within a cabinet, various devices for performing the three steps of (a) thermal decomposition of PFC, (b) exhaustion by washing or removal by fixing of the generated fluorine compounds, and (c) removal by burning of other flammable components.

Figure 1:
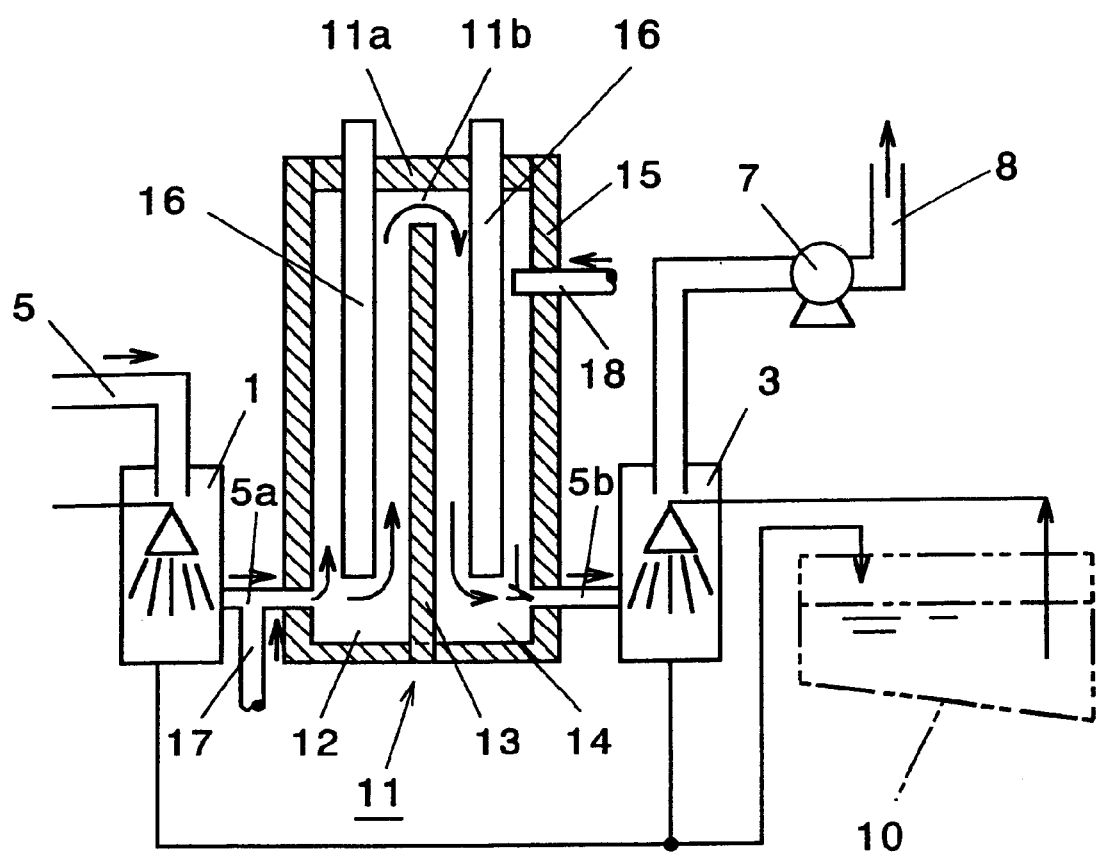
FIG. 1 is a front elevational view in section schematically showing the overall construction of a harm-removing apparatus as a first embodiment of the present invention.

FIG. 1 is a schematic view illustrating a first embodiment of a harm-removing apparatus according to the present invention. Referring to FIG. 1, the reference numeral 1 represents a front water scrubber (first water scrubber) disposed prior to (upstream of) the gas decomposer-burner tower 11. An exhaust gas containing PFC which has been sent through the tube 5 is washed by the front water scrubber 1 to remove Si dust contained in the exhaust gas.

The gas to be processed, which has been discharged out of the front water scrubber 1 is then sent into the gas decomposer room 12, through a pipe 5a.

A gas decomposer-burner tower 11 has a gas decomposer room 12 and a burner room 14. These rooms 12 and 14 are integral with and adjacent to each other across a heat-resistant partition wall 13 intervening therebetween. Stated otherwise, the gas decomposer-burner tower 11 of the harm-removing apparatus according to this embodiment includes an integral construction comprising a gas decomposer room 12 and a burner room 14 separated by the partition wall 13.

The partition wall 13 may be formed of a ceramic material such as a kaolin wool blanket.

The periphery of the gas decomposer-burner tower 11 is provided with a ceramic-based heat-insulating lining layer 15. Heaters 16 are provided as suspended vertically from top wall 11a of the gas decomposer-burner tower 11. A pipe 17 for introducing a reducing atmosphere forming agent, such as HC gas is connected to a pipe 5a interconnecting the first water scrubber 1 and the gas decomposer room 12. An air-feeding pipe 18 is connected to the burner room 14 at an upper portion thereof.

A gas to be processed introduced into the gas decomposer room 12 through the front water scrubber 1 is subjected to decomposition in a reducing (or non-oxidizing) atmosphere and then flows into the adjacent burner room 14 with retaining heat energy through the opening 11b defined in an upper portion of the partition wall 13. In the burner room 14, the gas is subjected to a burning process in an oxidizing atmosphere, and then cooled and washed by a water scrubber 3 located downstream of the burner room 14, followed by release of a resulting gas to the atmosphere.

Since the gas decomposer room 12 and the burner room 14 are located adjacent to each other with the intervening partition wall 13 therebetween and since a water scrubber 3 for provisionally cooling the gas is absent between the two rooms 12 and 14, energy consumption can be reduced.

Figure 8:
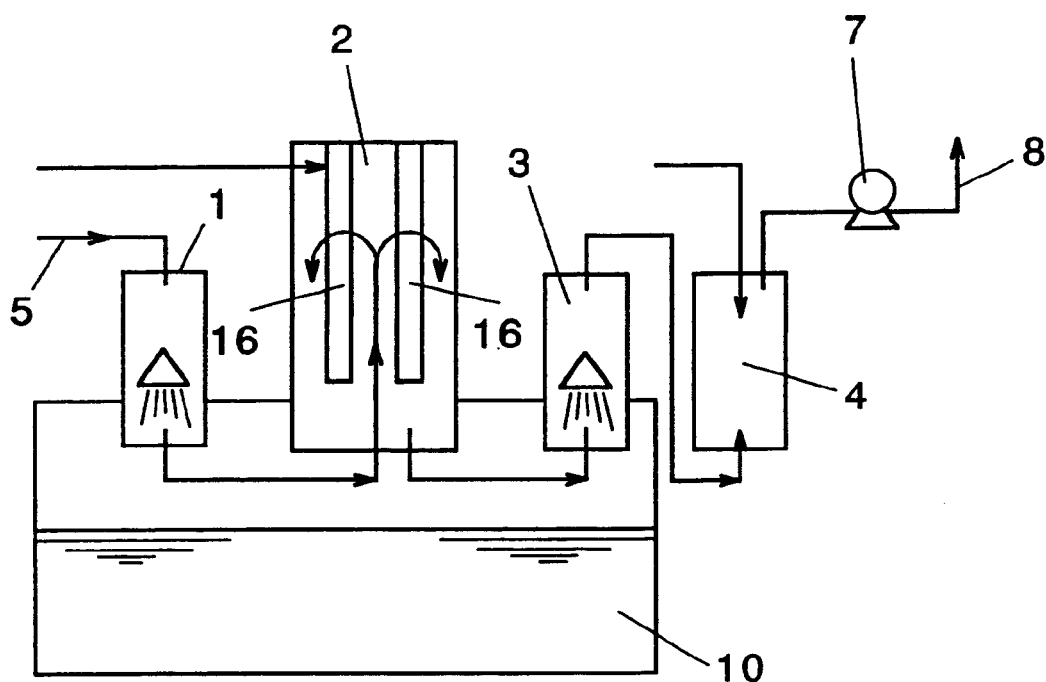
FIG. 8 is a front elevational view in section schematically showing the overall construction of a prior art harm-removing apparatus which is the first one of the harm-removing apparatuses developed by the inventor of the instant application.

The harm-removing apparatus of such a construction is compact as compared with a typical harm-removing apparatus having a gas decomposer tower 2 and a burner tower 4 as shown in FIG. 8 and hence requires a smaller area for its installation.

Further, there is no need to locate a water cistern 10 immediately below the gas decomposer-burner tower 11, and such a water cistern 10 can be located as shifted laterally from the location immediately below the gas decomposer-burner tower 11. Thus, the heat energy can be saved which would otherwise be wastefully consumed as radiant heat from a high-temperature portion forming an upper portion of the tower 11 which serves to warm the water in the water cistern 10.

Furthermore, since outside air fed into the burner room 14 through the air-feeding pipe 18 is heated during its downward movement within the burner room 14 by heat energy transferred from the gas decomposer room 12 through the opening 11b of the partition wall 13, the energy to be used can further be reduced.

In the gas decomposer room 12, the washed gas with $CF_4$ and $C_2F_6$ from the front water scrubber 1 is mixed with $C_3H_8$ and decomposed by heating under the non-oxidizing atmosphere The $CF_4$ and $C_2F_6$ in the said gas are decomposed by $C_3H_8$ as bellow:

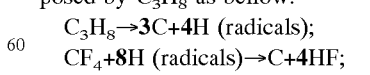
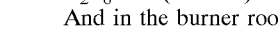
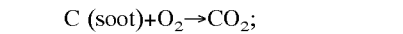

And in the burner room 14 the reaction take place.

$C (soot) + O_2 \rightarrow CO_2$;

residual $C_3H_8 + 5O_2 \rightarrow 3CO_2 + 4H_2O$

The heating in the above mentioned gas decomposer room 12 and burner room 14 may be carried out by internal electric heaters 16 suspended vertically from the top wall 11a of the gas decomposer-burner tower 11. In this case, a metal material would be corroded by a corrosive $F_2$ and/or HF gas generated in the gas decomposer room 12, so that it is recommended to coat the inside of the gas decomposer room 12 and the burner room 14 with an alloy having a high Ni content such as an Inconel (trademark) or with ceramics containing $Al_2O_3$ as a major component. If the electric heaters 16 are to be disposed inside the gas decomposer room 12 and the burner room 14, the heating element should be inserted in a $Al_2O_3$-based ceramic protection tube for protecting the heaters 16.

After the cleaning process, the exhaust gas containing PFC such as $CF_4$ and $C_2F_6$ is introduced into the gas decomposer room 12 using an inert gas, typically $N_2$, as a carrier gas. Here, the residual gas of oxidants, such as $O_2$ and $O_3$, that have been used in the semiconductor manufacturing apparatus employing CVD or the like is introduced as it is into the exhaust-gas harm-removing apparatus of the present invention. However, additional oxidant such as $O_2$ or external air is not introduced into the gas decomposer room 12 of the exhaust-gas harm-removing apparatus of the present invention. Accordingly, separated $O_2$ does not exist in the gas decomposer room 12.

Then, any one of saturated or unsaturated $C_1$–$C_8$ hydrocarbons, $NH_3$ gas or a mixture gas thereof is positively introduced into the gas decomposer room 12 through a hydrocarbon gas introduction pipe 17 connected to the tube 5a. The exhaust gas containing PFC is decomposed by the hydrocarbon, $NH_3$ or a mixture gas under the heated and reducing (or non-oxidizing) atmosphere. Specific examples of the hydrocarbon to be used in the present invention include methane, ethane, propane, n- or iso- (the same applies to the subsequent hydrocarbons) butane, pentane, hexane, heptane, octane, ethylene, propylene, butylene, budadiene, and further aromatic hydrocarbons such as benzene, toluene, and xylene. A city gas may be used as well.

Since residual carbon increases with increasing proportion of carbon (C) relative to hydrogen (H) thereby producing soot easily, it is preferable to use $CH_4$, $C_2H_6$, $C_3H_8$, $C_4H_{10}$ or the like. $NH_3$ can also be used as a reducing atmosphere forming agent since it serves as a hydrogen supplier having a plurality of hydrogen atoms like a hydrocarbon. When $NH_3$ is used, it neutralizes HF produced in the gas decomposer tower to give a salt of $NH_4F$ which can be expected to inhibit corrosion against the materials of the apparatus. The foregoing reducing atmosphere forming agents (gases) may used either alone or as a mixture of two or more of them.

The concentration of PFC that can be removed according to the present invention extends in a wide range. For example, if the concentration of PFC is within a range of 100 ppm to 5%, at least 90% of the PFC can be removed. Although the removal of PFC is possible for a PFC concentration in a range of less than 100 ppm or more than 5%, it may not be possible to attain more than 90% of the harm-removing ratio.

The flow rate of the gas to be processed according to the present invention is preferably within a range of 5 to 700 liters/min. Although the removal process can be carried out for a flow rate of less than 5 liters/min, the energy efficiency of the apparatus would be poor, giving rise to useless operations. If the flow rate is more than 700 liters/min, transmission of energy to the gas to be processed would be insufficient, whereby the removal ratio is likely to decrease.

The amount of hydrocarbon gas to be present in decomposing PFC is preferably 0.1 to 3 mol with respect to 1 mol of the PFC. If the amount is less than 0.1 mol, the effect of decreasing the decomposition temperature and increasing the removal ratio, which is the purpose of the present invention, is unsatisfactory. On the other hand, if the amount is more than 3 mol, thermally decomposed products such as soot are generated in a large amount in the processed exhaust gas, leading to useless consumption of hydrocarbons and complication of the steps for post-processing the exhaust gas after decomposition, although the PFC removal ratio of more than 90% may be attained; hence it is not preferable.

Whether the heating source or heater 16 is located outside or inside of the gas decomposer room 12, the temperature within the room 12 can be in a low temperature zone of several hundred degrees centigrade as compared with a simple thermal decomposition (including oxidation decomposition) which is not the method of the present invention.

By a conventional simple thermal decomposition, the removal ratio might be no greater than 80 to 85% at a temperature zone of, for example, 1100 to 1200° C. for decomposing $C_2F_6$, for example. Moreover, a byproduct $CF_4$ would appear in the processed gas.

In the case of decomposing $CF_4$, in a conventional system the removal ratio is at most about 70% even at a temperature zone of 1400° C., which ratio is far from the ratio of 90% intended by the present invention. Furthermore, if the electric heater is to be used as a heat source, it is technically difficult to use the electric heaters 16 at a temperature around 1400° C. for a long period of time, so that preferably the heater should be used at a temperature below 1100° C.

According to the present invention, PFC can be removed at a temperature lower than in decomposing PFC alone or in the presence of $O_2$. A temperature of 850° C. would be sufficient for decomposing $C_2F_6$; and $CF_4$ can be removed at a temperature of 1000 to 1200° C. at a removal ratio of more than 90%.

According to the present invention, the hydrocarbons introduced into the gas decomposer room 12 react with any residue of $O_2$ or $O_3$ that may have been used for oxidizing PFC during the cleaning process in the semiconductor manufacturing apparatus, thus allowing the residue to disappear, and further the hydrocarbons are thermally decomposed into various components at a given temperature.

For example, propane is decomposed at a temperature of 780° C. to be converted into such substance as methane, ethane, ethylene, propylene, hydrogen, and carbon. During the process, PFC such as $C_2F_6$ and $CF_4$ will be involved in the decomposition, whereby the fluorine components are separated in the form of $F_2$ or HF as mentioned above.

The fluorine components of PFC processed in the gas decomposer room 12 are discharged in the form of $F_2$ and/or HF.

This processed gas is the fed from the gas decomposer room 12 to the burner room 14 through a communication opening 11b defined in an upper portion of the partition wall 13. The gas introduced into the burner room 14 is mixed with outside air taken into this room 14 through the air-feeding pipe 18, and the flammable components of the gas are burnt to give $CO_2$ and $H_2O$ eventually. The processed gas of which the flammable components have been burnt out is fed to the rear water scrubber 3 or an adsorber tower 3a through a pipe 5b connected to a lower end portion of the burner room 14. The processed gas is passed through the rear water scrubber (second water scrubber) 3 to dissolve its fluorine components in water or introduced into the adsorber tower 3a loaded with a CaO or $CaCO_3$ solid filler to allow the fluorine components to be adsorbed and removed in the form of $CaF_2$.

Figure 2:
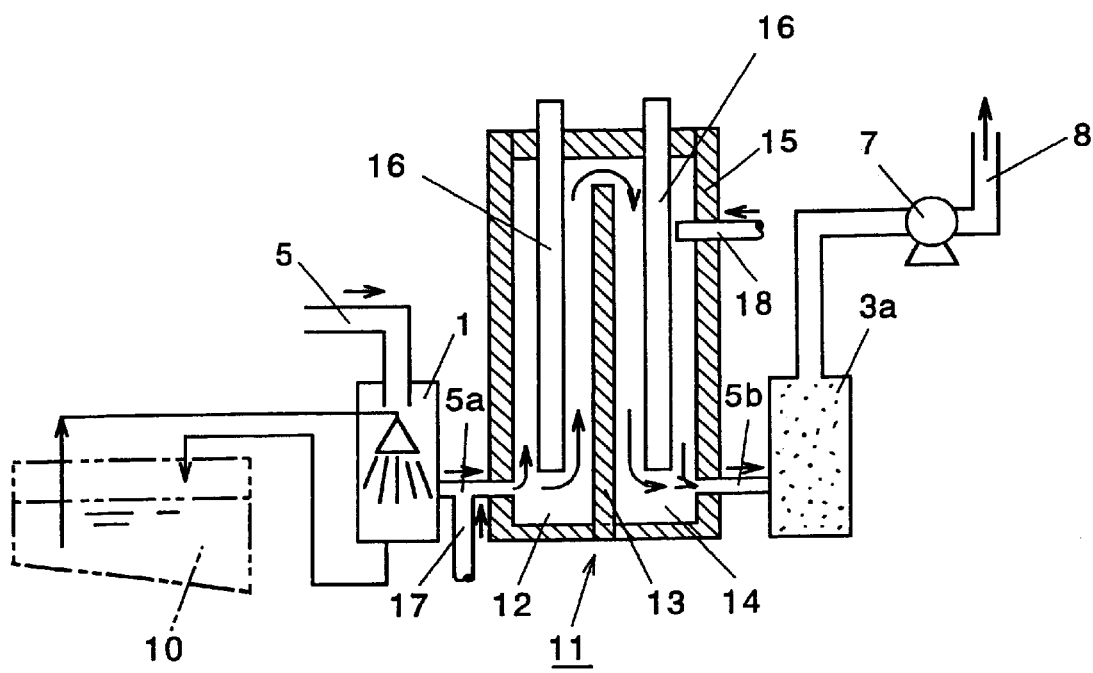
FIG. 2 is a front elevational view in section schematically showing the overall construction of a harm-removing apparatus as a third embodiment of the present invention.
Figure 3:
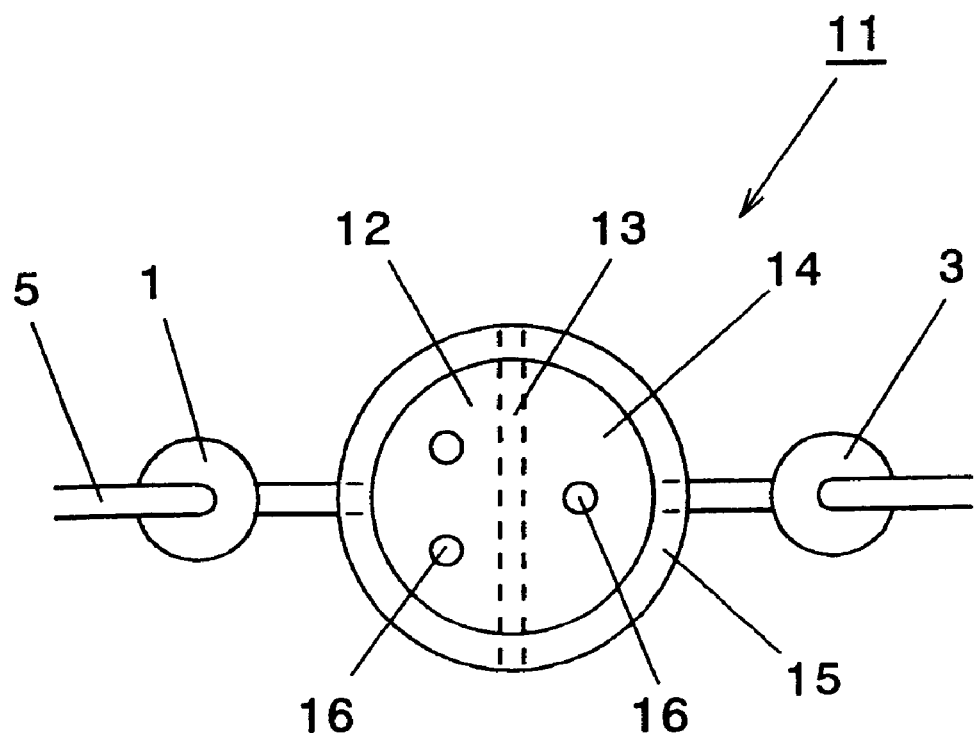
FIG. 3 is a plan view of the apparatus shown in FIG. 1 or FIG. 2.

The gas body thus deprived of the fluorine components by any of the above-mentioned methods is discharged into atmospheric air through the gas discharging tube 8. In FIGS. 1, 2, the reference numeral 7 represents a suction fan.

EXAMPLE 1 FIG. 1

A mixed gas containing $CF_4$ at 1% and $N_2$ at 99% was passed at a flow rate of 30 liters/min through a front water scrubber (first water scrubber) into a bottom opening of a gas decomposer room of the decomposer-burner tower. The gas decomposer-burner tower has an inner wall coated with an alumina-based castable fire-resistant material and incorporates 15 rod-like electric heaters (enclosed in an alumina-based protection tube) dangling therein.

A mixture gas containing propane at 90% and n-butane at 10% was supplied at a flow rate of 0.3 liter/min into the gas decomposer room. The heater surface temperature was maintained at 1100° C. Thus, in rising from the bottom opening to the top opening, the cleaned exhaust gas containing PFC is discomposed by a mixed gas under the reducing (or non-oxidizing) atmosphere.

Then, the decomposed gas was introduced into a burner room whose inside was maintained at a temperature of 500° C., whereby the processed flammable gas (residual $C_3H_8$ and C[soot]) was burnt and oxidized in the presence of air introduced from outside.

The burnt gas was sucked by a fan disposed outside of the cabinet and, while maintaining the system in a negative pressure state, it was passed through a rear water scrubber (second water scrubber) to allow the generated byproducts of $F_2$ and HF to be absorbed and dissolved in water. The flow rate of water to be used was 10 liters/min.

Measurement showed that the $CF_4$ concentration in the processed gas was 50 ppm, giving a $CF_4$ removal ratio of 99.5%.

COMPARATIVE EXAMPLE 1

A gas having the same $CF_4$ composition as in Example 1 was supplied at a flow rate of 30 liters/min into the same removal apparatus as in Example 1. The gas was processed by maintaining the heater surface temperature at 1100° C. without supplying any hydrocarbons. Measurement showed that the $CF_4$ concentration in the processed gas was 9100 ppm, giving a removal ratio of only 9%.

Further, under the above condition, the heater surface temperature was raised to 1450° C. for an instant to process the gas. Measurement showed that the $CF_4$ concentration in the processed gas was 3200 ppm, giving a removal ratio of 68%.

Under this temperature condition, air was additionally supplied from outside at a flow rate of 5 liters/min to process the gas. Measurement showed that the $CF_4$ concentration in the processed gas was 3000 ppm, giving a removal ratio of 70%.

From the above results, it will be understood that the present invention enables almost complete removal of PFC even at a temperature lower by 350° C. than that of the Comparison Example. Thus, since the purpose of the present invention can be achieved at a temperature lower by 300 to 400° C., the selection range of the material to be used would be widened in terms of the heat resistance of the apparatus.

EXAMPLE 2 FIG. 1

A mixed gas containing $C_2F_6$ at 2%, $N_2$ at 97.9%, and oxygen at 0.1% was passed through a front water scrubber and supplied into a gas decomposer room at a flow rate of 100 liters/min. The gas decomposer room is made of SUS316L with its inside being coated with an alumina-based castable fire-resistant material. An electric heater wire is wound around the outside of the room to heat the gas from the outside.

Into the gas decomposer room was supplied a city gas (13A) containing methane at 88%, ethane at 6%, propane at 4%, and butane at 2% at a flow rate of 4 liters/min. The spatial temperature inside the gas decomposer room was maintained at 850° C. The processed gas was passed through a burner room maintained at 600° C. and having air supplied from outside, and discharged to outside. The mist-like soot (C) and the residual city gas transferred to the burner room were removed. After that, the burnt gas was washed in a rear water scrubber with water supplied at a flow rate of 15 litter/min.

Measurement showed that the $C_2F_6$ concentration in the gas released into atmospheric air was 400 ppm, giving a removal ratio of 98%. No presence of $CF_4$ was observed in the processed gas.

EXAMPLE 3 FIG. 2

Under the same condition as in Example 2, an apparatus equipped with an adsorber tower loaded with soybean-size granular CaO was employed instead of using the rear water scrubber, and the gas processed in the gas decomposer-burner tower was passed through the adsorber tower. Under a suction condition using an external fan, no acidic component was observed in the discharged gas.

COMPARATIVE EXAMPLE 2

The exhaust gas containing PFC was processed under the same condition as in Example 2 except that the city gas was not supplied. Measurement showed that the $C_2F_6$ concentration in the gas discharged into the atmospheric air was 1.76%, giving a removal ratio of 12%. Also, $CF_4$ appeared newly as a byproduct in the processed gas. Therefore, the PFC removal ratio is even worse than 12%.

Under the above condition, removal of $C_2F_6$ was carried out under the same condition except that the spatial temperature in the room was maintained at 1150° C. Measurement showed that the $C_2F_6$ concentration in the discharged gas was 4000 ppm, giving a removal ratio of 80%. Also, presence of $CF_4$ component as a byproduct was confirmed.

EXAMPLE 4

Next, the harm-removing apparatus embodying the present invention was compared as to removal ratio and energy consumption with a separate-type harm-removing apparatus (the first one of the apparatuses developed by the inventor of the instant application) as shown in FIG. 8, including a gas decomposer tower 2 and a burner tower 4 separately provided and a water scrubber 3 disposed between these towers 2 and 4.

Before comparison as to energy consumption, the apparatus shown in FIG. 8 is briefly described. This apparatus includes a first water scrubber 1, a gas decomposer tower 2 connected to the downstream side of the first water scrubber 1 and having electric heaters 16 suspended from the top wall thereof, a second water scrubber 3 connected to the downstream side of the gas decomposer tower 2, a burner tower 4 connected to the downstream side of the second water scrubber 3, piping system interconnecting these elements, and a water cistern 10 on which the first and second water scrubbers 1 and 3, and the gas decomposer tower 2 stand. Instead of the second water scrubber 3, it is possible to provide an adsorber tower (not shown) loaded with granular CaO or $CaCO_3$ or reverse the positional sequence of the second water scrubber 3 (or the adsorber tower) and the burner tower 4 by locating the burner tower 4 on the downstream side of the gas decomposer tower 2 and the second water scrubber 3 (or the adsorber tower) downstream of the burner tower 4.

With the apparatus, an exhaust gas containing PFC is washed by the first water scrubber 1 to remove dust and soluble components contained in the exhaust gas, and the gas thus washed is mixed with a reducing atmosphere forming agent and thermally decomposed under a condition without free oxygen. Subsequently, the gas thus thermally decomposed is washed by the second water scrubber 3 or subjected to chemical adsorption at the adsorber tower, and finally the flammable components of the resulting gas are burnt at the burner tower 4, followed by release of a resulting gas to the atmosphere through a fan.

Of course, if the positional sequence of the second scrubber 3 (or the adsorber tower) and the burner tower 4 is reversed, the processing sequence corresponding thereto is reversed.

If the PFC-containing exhaust gas to be processed does not contain dust, it may be directly fed to the gas decomposer tower 2 or gas decomposer room 12 without passing through the first water scrubber 1. This holds true for all the embodiments of the present invention.

First, a mixed gas containing $CF_4$ at 1.5% and $N_2$ at 98.5% was fed to the gas decomposer tower 2 of the separate-type harm-removing apparatus at a flow rate of 60 liters/min. To the mixed gas in the gas decomposer tower 2 was added a mixed gas containing propane at 90% and n-butane at 10% at a flow rate of 0.6 liters/min, and the temperature of the heaters was maintained at 1300° C.

Measurement of a gas discharged from the burning tower 4 showed that the concentration of $CF_4$ in the gas was 500 ppm, giving a removal ratio of 96.7%. The electric power consumption of the separate-type apparatus in a steady state was 7 kW/h.

Since the internal volume of the gas decomposer tower 2 was 24 liters and the flow rate of the gas to be processed was 60.6 liters/min=3,636 liters/hr, it follows that SV (space velocity)=3,636/24=151.5 $hr^{-1}$.

On the other hand, a mixed gas of the same composition as above was processed by the apparatus of this embodiment with the heaters maintained at the same temperature as above. Measurement showed that the concentration of $CF_4$ in the gas processed was 400 ppm, giving a removal ratio of 97.3%.

The electric power consumption of this apparatus in a steady state was 3.5 kW/h, which was about ½ of that of the separate-type apparatus.

Since the internal volume of the gas decomposer room 12 of this embodiment was 21 liters and the flow rate of the gas to be processed was 60.6 liters/min=3,636 liters/hr, it follows that SV (space velocity)=3,636/21=173.1 $hr^{-1}$.

From the foregoing, it can be understood that the apparatus of the embodiment attained a removal ratio which was substantially equal to that attained by the separate-type apparatus while reducing the energy consumption to about ½ of that of the separate-type apparatus.

EXAMPLE 5

This embodiment relates to a harm-removing apparatus which is capable of improving the PFC removal ratio and further improving the heat energy efficiency at a temperature realized by electric heaters.

To improve the PFC removal ratio, the harm-removing apparatus needs to have a structure allowing a sufficient energy to be transferred to a gas to be processed and a sufficient time to be secured therefor.

Thus, this embodiment has electric heaters 26 disposed horizontally and a plurality of heat-resistant rods 29 disposed horizontally as a grating below the heaters 26 for sufficient distribution and insulation of heat and for stirring the gas flowing.

Figure 4:
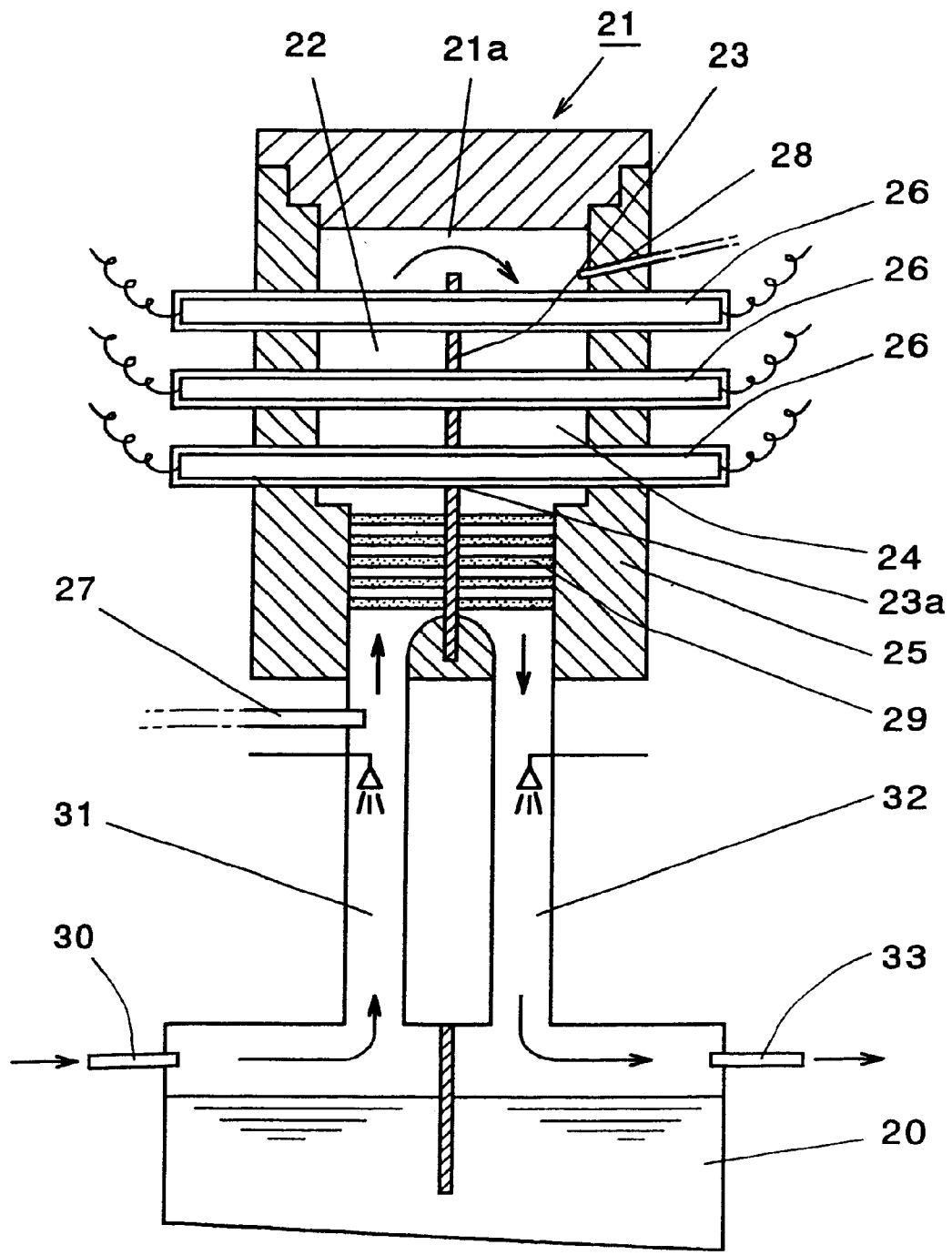
FIG. 4 is a front elevational view in section schematically showing the overall construction of a harm-removing apparatus as a fifth embodiment of the present invention.
Figure 5:
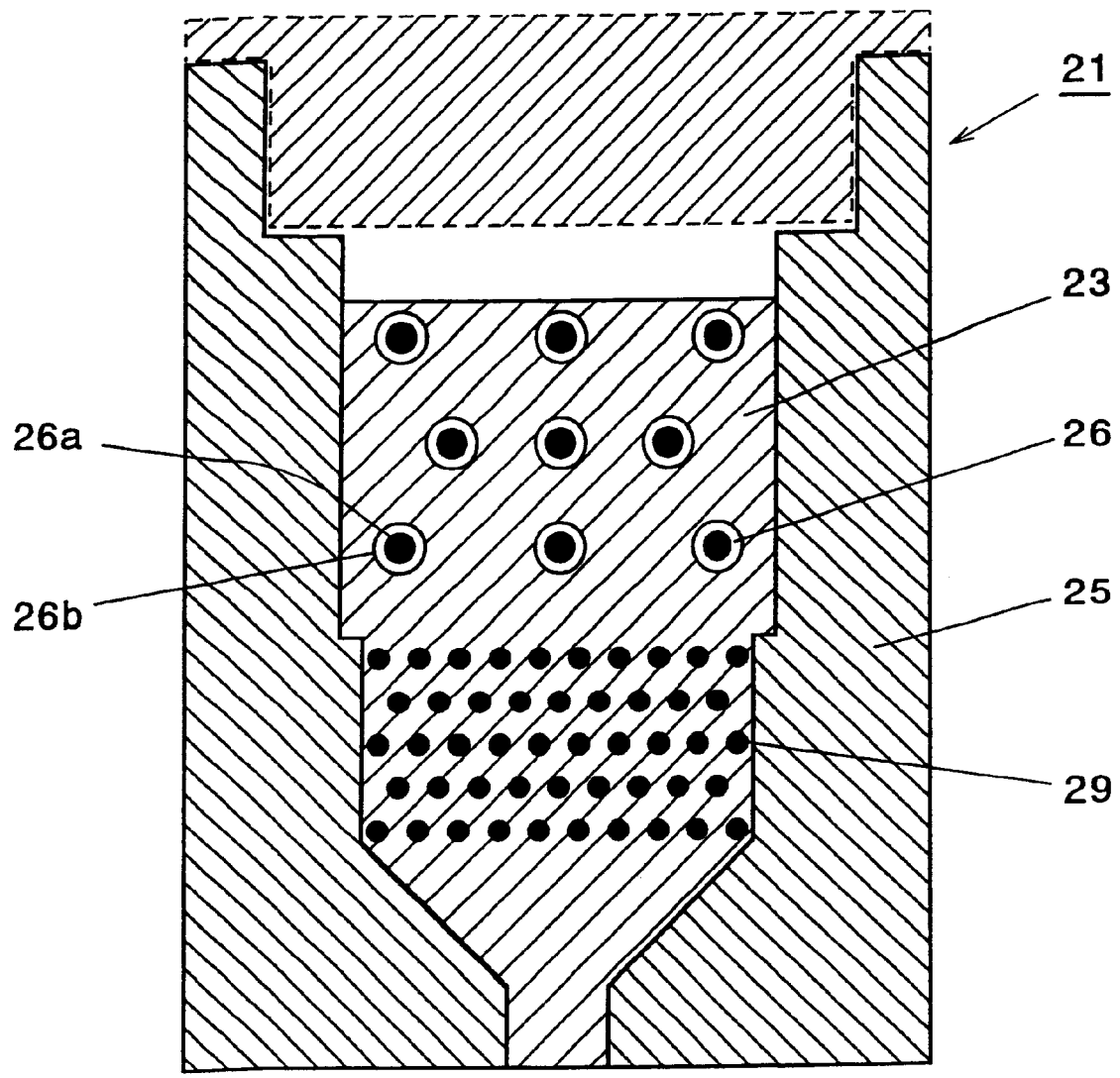
FIG. 5 is a sectional view, taken perpendicular to FIG. 4, of the gas decomposer-burner tower of the apparatus according to the fifth embodiment.
Figure 6:
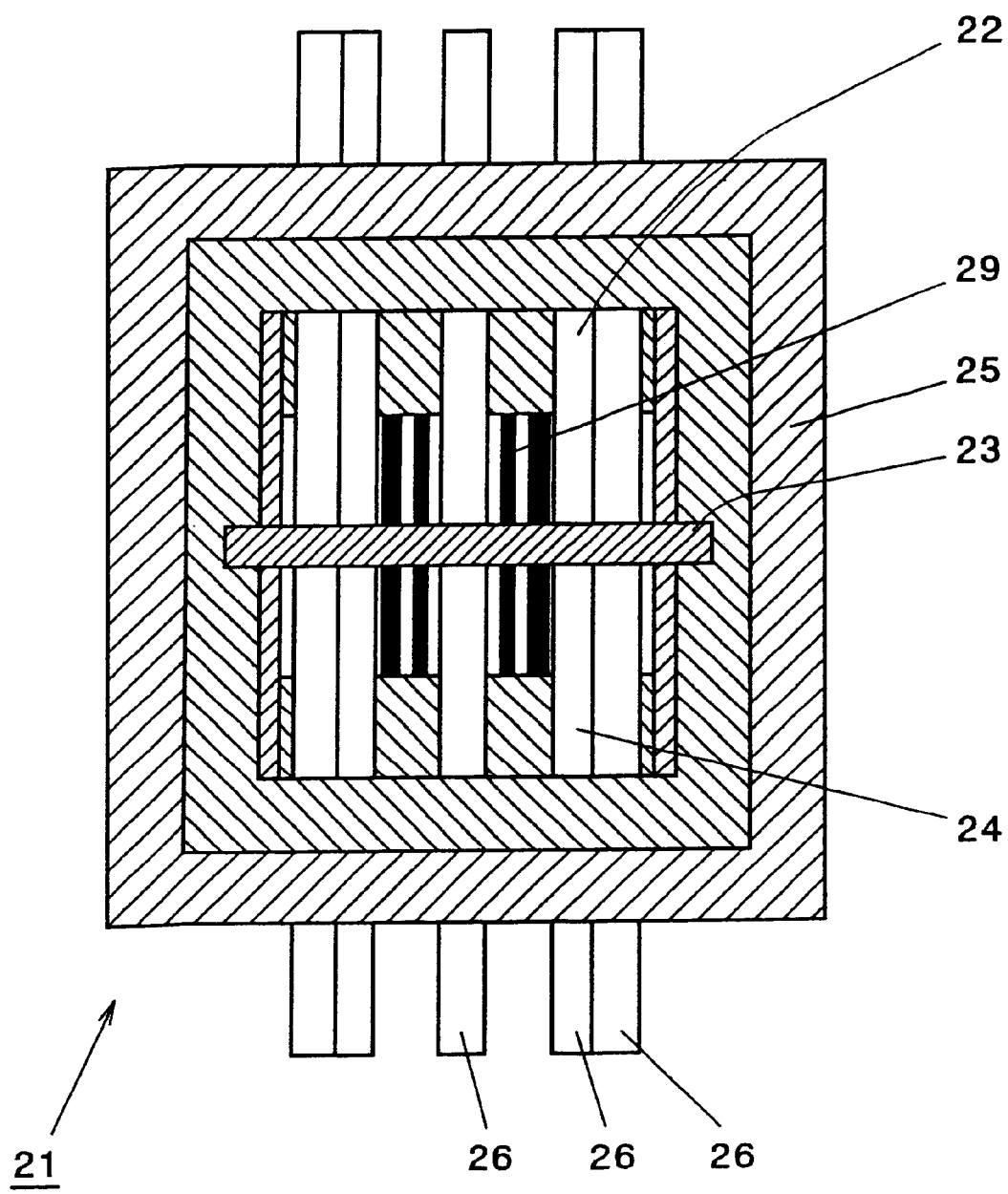
FIG. 6 is a plan view in section of the apparatus shown in FIG. 4.

FIGS. 4 to 6 schematically illustrates the apparatus of this embodiment which includes a pipe 30 for introducing a PFC-containing gas to be processed, a water cistern 20, a first water scrubber 31, a gas decomposer-burner tower 21, a second water scrubber 32, and a pipe 33 for releasing a processed gas to the atmosphere, the gas decomposer-burner tower 21 being disposed above the first and second water scrubbers 31 and 32.

FIG. 5 is a side elevational view in section of the gas decomposer-burner tower 21, and FIG. 6 is a plan view in section of the gas decomposer-burner tower 21. The gas decomposer-burner tower 21 is partitioned into a gas decomposer room 22 serving as a gas decomposer tower and a burner room 24 serving as a burner tower by a partition wall 23 having a heat resistance. The gas decomposer room 22 and the burner room 24 communicate with each other through an opening 21a defined in an upper end portion of the partition wall 23. Thus, the gas having been subjected to decomposition in a reducing (or non-oxidizing) atmosphere at the gas decomposer room 22 can pass through the opening 21a at the upper portion of the partition wall 23 into the burner room 24.

As in embodiment 1, the gas decomposer room 22 and the burner room 24 are located adjacent to each other with the partition wall 23 intervening therebetween, and a water scrubber provisionally cooling the gas is not present between these rooms. Thus, this embodiment can reduce the energy consumption.

The partition wall 23 may be formed of a ceramic material such as kaolin blanket. The gas decomposer-burner tower 21 is formed with a heat-insulator lining layer 25 of a ceramic material to reduce a heat energy loss. Reference numeral 27 designates a pipe for introducing a reducing atmosphere forming agent, and reference numeral 28 designates an air-feeding pipe. The pipe 27 is connected to a upper portion of the a gas decomposer room 22, and the air-feeding pipe 28 is connected to a upper portion of the burnt room 24.

The electric heaters 26 are each in the form of rod and disposed horizontally as extending through the partition wall 23 to avoid an uneven temperature distribution which is likely with the vertical or suspended arrangement of heaters.

More specifically, the temperature within the gas decomposer room 22 and the burnt room 24 becomes higher with higher position in the room due to gas flow. Therefore, in the case of the vertical arrangement of the electric heaters 26, even when the temperature at an upper portion of the heaters reaches a predetermined value, it is difficult to maintain the temperature at the lower half of the heaters to a sufficiently high value for decomposition. When the heaters are controlled such that the temperature at the lower half of the heaters assumes a predetermined value or higher, the upper half of the heaters is overheated, with the result that the energy efficiency becomes worse and that the heating elements 26a of the electric heaters 26 become prone to break by fusion.

In contrast, the horizontal arrangement of the electric heaters 26 makes it possible to maintain a uniform temperature distribution along the length of the heaters 26, hence, easily form an atmosphere having a temperature distribution required for thermal decomposition of PFC gas.

As is often the case with a harm-removing apparatus installed in a clean room, a sufficient space cannot be secured between the ceiling of the clean room and the apparatus. In such a case, it is not easy to replace a failed one of vertically suspended electric heaters with a new one. By contrast, the horizontal arrangement of heaters 26 according to this embodiment allows any one of the heaters 26 to be removed horizontally thereby making the replacing operation very easy.

The number of heaters 26 to be used is preferably about 6 to about 12. These heaters are arranged equidistantly from each other in two to four tiers, and heaters in one tier are located offset to those in another tier so that the gas is prevented from moving straightforward. For convenience in practical use, this embodiment uses nine heaters in three tiers, three heaters in one tiers. Each of the electric heaters used in this embodiment comprises a protective tube 26b of 99.5% α-$Al_2O_3$ having an outer diameter of 40 mm and a heater element 26a of SiC inserted into the protective tube 26b.

The plurality of heat-resistant rods 29 are horizontally disposed 100 mm below the heaters 26 in the lowest tier as extending through the partition wall 23. In this embodiment, the heat-resistant rods 29 are arranged parallel with the electric heaters 26 (namely along the longitudinal direction of the heaters 26), but may be arranged perpendicular to the electric heaters 26.

Preferably, the heat-resistant rods 29 each have a heat resistance of 1300° C. or higher and a corrosion resistance against $F_2$ and HF gases. Ceramic rod stocks may be used therefor. Particularly advantageous is a rod formed mainly of $Al_2O_3$ having a circular section. Each heat-resistant rod 29 may be either solid or hollow (pipe-shaped). This embodiment uses 48 heat-resistant rods in five tiers, each rod comprising a pipe of 99.5% α-$Al_2O_3$ having a diameter of 10 mm. The number of heat-resistant rods and the diameter of each rod are not limited thereto, but may be determined appropriately. Like the heaters 26, the heat-resistant rods 29 in one tier are located offset to those in another tier so that the gas is prevented from moving straightforward, The heat-resistant rods 29 exhibits the same effect as the grating of a furnace structure, and work to receive heat from the heaters located above to prevent dissipation of heat energy downwardly from the gas decomposer-burner tower 21 while preheating the PFC-containing gas and the reducing atmosphere forming agent introduced through the pipe 27.

During passage through spaces between adjacent heat-resistant rods, the PFC-containing gas and the reducing atmosphere forming agent are mixed by turbulence generated by the heat-resistant rods 29.

Further, since the flow velocity of the gas is lowered by the heat-resistant rods, it is possible to secure a sufficient residence time within the gas decomposer-burner tower 21, thereby improving the harm removal ratio.

The electric heaters 29 are disposed as extending through the gas decomposer-burner tower 21 and the partition wall 23 located therein and the heat-resistant rods 29 are disposed as extending through the partition wall 23. The portions through which the heaters and rods are inserted are applied with a sealant composed mainly of ceramic fiber having a heat resistance and a corrosion resistance thereby preventing leakage of gases.

The temperatures measured at different points of the apparatus of this embodiment were as follows:

heater surface: 1200 to 1350° C.;

spaces in the gas decomposer room and burner room: 1200 to 1300° C.;

lower part of the gas decomposer room (between the heaters and the heat-resistant rods): 800° C.;

lowermost part of the gas decomposer room (gas-introducing portion below the heat-resistant rods): 200 to 300° C.;

lower part of the burner room (between the heaters and the heat-resistant rods): 1200° C.;

lowermost part of the burner room (processed gas discharging portion below the heat-resistant rods): 800° C.; and point immediately after the second water scrubber: 200° C.

As can be understood from these results, dissipation of heat energy downward of the tower was effectively prevented.

Harm removal was performed using the apparatus of this embodiment.

A mixed gas containing $CF_4$ at 1.0% and $N_2$ at 99.0% was passed through the first water scrubber 31 and then fed to the gas decomposer room 22 located above at a flow rate of 140 liters/min. Further, to the gas decomposer room 22 was supplied propane gas as the reducing atmosphere forming agent at a flow rate of 1.4 liters/min so as to be thermally decomposed together with the coexisting $CF_4$.

The gas thermally decomposed in the gas decomposer room 22 flows into the burner room 24 through the opening 21a defined in an upper portion of the partition wall 23. In the burner room 24, the gas is burnt together with outside air introduced from the air-feeding pipe 28 to remove the flammable components thereof, and then cooled and washed by the second water scrubber 32 located below the burner room 24, followed by release of a resulting gas to the atmosphere.

Measurement of the gas discharged from the second scrubber 32 showed that the concentration of $CF_4$ in the gas was 50 ppm, giving a removal ratio of 99.5%. The electric power consumption in the harm-removing process was 9 kW/h.

In the same condition as in the above except that $NH_3$ gas was used at a flow rate of 3.6 liters/min instead of the propane gas, removal of $CF_4$ was performed. Measurement of the gas processed showed that the $CF_4$ concentration of the gas was 60 ppm, giving a removal ratio of 99.4%.

COMPARATIVE EXAMPLE 3

For comparison, removal of $CF_4$ was performed using a harm-removing apparatus similar to the apparatus of embodiment 5 except that nine electric heaters were disposed as vertically suspended and any heat-resistant rod was not used.

The flow rate of the gas to be processed was reduced to 120 liters/min, and the gas was processed using 1.2 liter/min of propane. Measurement showed that the $CF_4$ concentration of the gas processed was 2,500 ppm, giving a removal ratio of 75%.

The electric power consumption of this process was 15 kW/h, which was 1.7 times as large as that of the process using the apparatus of embodiment 5. As can be understood also from these results, the harm-removing apparatus of embodiment 5 exhibits a higher harm removal ratio and requires lower energy cost.

Figure 7:
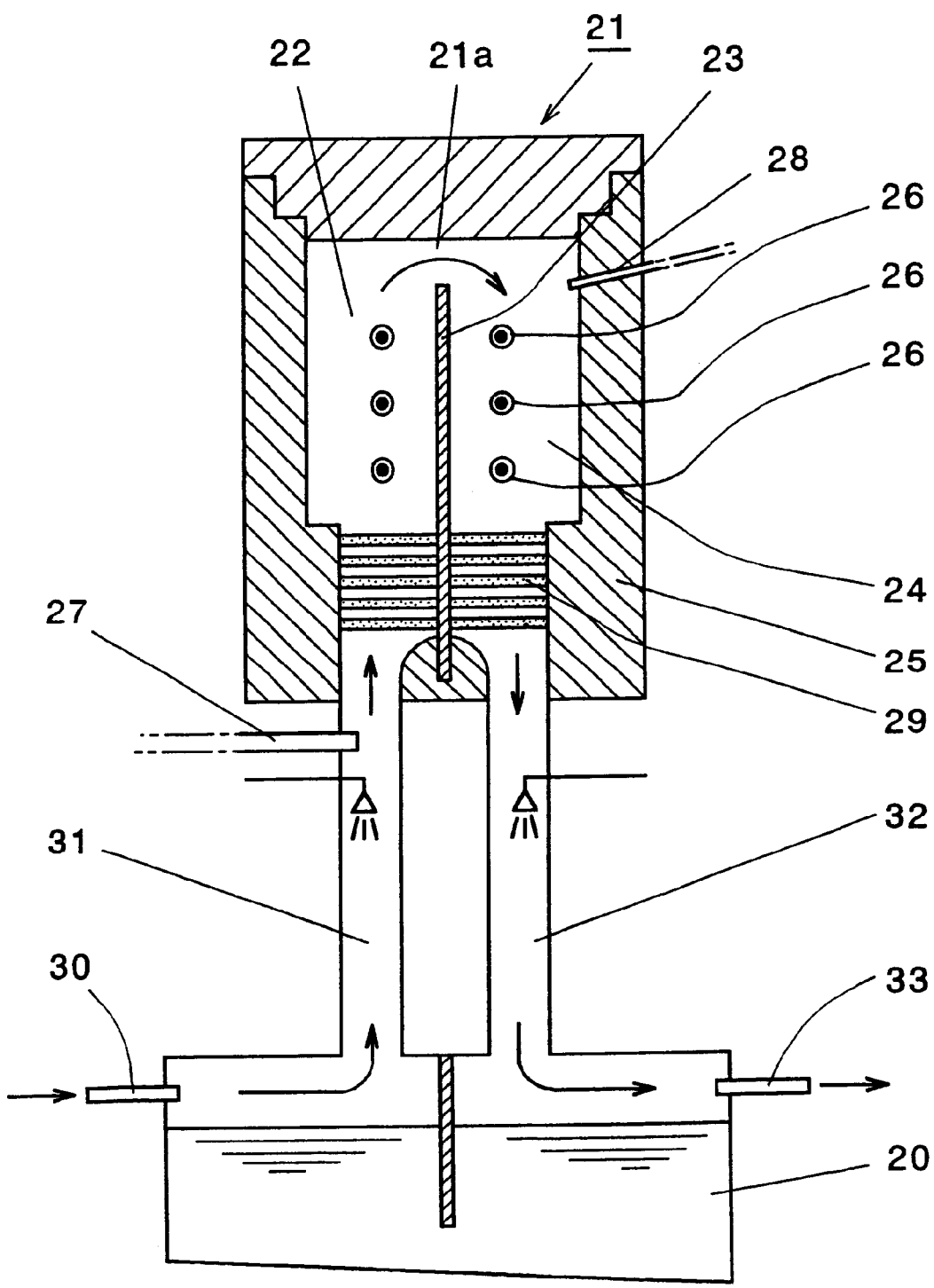
FIG. 7 is a front elevational view in section schematically showing the overall construction of a harm-removing apparatus as a modification of the of FIG. 4.

FIG. 7 illustrates another embodiment of the apparatus shown in FIG. 4, in which electric heaters 26 are disposed parallel with partition wall 23. In the apparatus shown in FIG. 4, the through-hole 23a of the partition wall 23 through which electric heaters 26 are extending is completely closed so as to prevent exhaust gas from flowing into the burner room 24 from the gas decomposer room 22, and the electric heaters 26 are fixed to the partition wall 23. In this case, $Al_2O_3$, protective tube 26b of each electric heater 26 is likely to break due to thermal expansion against the partition wall 23 when energized and heated. Unlike the arrangement of FIG. 4, the arrangement of FIG. 7 can avoid such a trouble since the electric heaters 26 are disposed parallel with the partition wall 23 and hence are free from the partition wall 23.

As mentioned above, the present invention can provide a harm-removing methods and apparatuses capable of decomposing and removing PFC components at a high removal ratio at a low temperature (with less consumption of heat energy). Accordingly, the PFC gas, whose removal is difficult, can be removed at a low energy cost.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. Apparatus for removing harmful components of a perfluorocarbon gas or a perfluorocompound, comprising:
   (a) a gas decomposer-burner tower having:
      a gas decomposer room for mixing at least one of a hydrocarbon gas and $NH_3$ gas with an exhaust gas containing a perfluorocarbon or a perfluorocompound discharged from manufacturing equipment and thermally decomposing a resulting mixed gas in a non-oxidizing atmosphere;
      a burner room for burning flammable components of the mixed gas thermally decomposed in the gas decomposer room;
      the gas decomposer room and the burner room being formed integrally with each other and situated across an intervening heat-resistant partition wall having an opening at an upper end portion thereof for providing communication between the gas decomposer room and the burner room;
   (b) a heater disposed in the gas decomposer room and the burner room;
   (c) a pipe for supplying a reducing atmosphere forming agent to the gas decomposer room;
   (d) an air-feeding pipe for supplying air to the burner room; and
   (e) a water scrubber disposed downstream of the gas decomposer-burner tower.

2. Apparatus for removing harmful components of a perfluorocarbon gas or a perfluorocompound, comprising:
   (a) a gas decomposer-burner tower having:
      a gas decomposer room for mixing at least one of a hydrocarbon gas and $NH_3$ gas with an exhaust gas containing a perfluorocarbon or a perfluorocompound discharged from manufacturing equipment and thermally decomposing a resulting mixed gas in a non-oxidizing atmosphere;
      a burner room for burning flammable components of the mixed gas thermally decomposed in the gas decomposer room;
      the gas decomposer room and the burner room being formed integrally with each other and situated across an intervening heat-resistant partition wall having an opening at an upper end portion thereof for providing communication between the gas decomposer room and the burner room;
   (b) a heater disposed in the gas decomposer room and the burner room;
   (c) a pipe for supplying a reducing atmosphere forming agent to the gas decomposer room;
   (d) an air-feeding pipe for supplying air to the burner room; and
   (e) an adsorber tower disposed downstream of the gas decomposer-burner tower and loaded with granular CaO or $CaCO_3$.

3. The apparatus according to claim 1 or 2, further comprising a water scrubber disposed upstream of the gas decomposer-burner tower for washing the exhaust gas discharged from the manufacturing equipment with water prior to the thermal decomposition of the mixed gas in the non-oxidizing atmosphere.

4. The apparatus according to claim 1 or 2, wherein the heater is disposed horizontally in the gas decomposer room and the burner room.

5. The apparatus according to claim 1 or 2, further comprising a grating horizontally disposed below the heater disposed in the gas decomposer room and the burner room.

6. Apparatus for removing harmful components of a perfluorocarbon gas or a perfluorocompound, comprising:
   (a) a first water scrubber for washing with water an exhaust gas containing a perfluorocarbon or a perfluorocompound discharged from manufacturing equipment;
   (b) a gas decomposer-burner tower having:
      a gas decomposer room connected to an upper end of the first water scrubber for mixing at least one of a hydrocarbon gas and $NH_3$ gas with the exhaust gas washed by the first water scrubber and thermally decomposing a resulting mixed gas in a non-oxidizing atmosphere;
      a burner room for burning flammable components of the mixed gas thermally decomposed in the gas decomposer room; the gas decomposer room and the burner room being formed integrally with each other and situated across an intervening heat-resistant partition wall having an opening at an upper end portion thereof for providing communication between the gas decomposer room and the burner room;
   (c) a heater horizontally disposed in the gas decomposer room and the burner room;
   (d) a grating horizontally disposed below the heater in the gas decomposer room and the burner room;
   (f) a pipe for supplying a reducing atmosphere forming agent to the gas decomposer room;
   (g) an air-feeding pipe for supplying air to the burner room;
   (f) a second water scrubber connected to a lower end of the burner room; and
   (g) a water cistern on which the first and second scrubbers stand.

7. Apparatus for removing harmful components of a perfluorocarbon gas or a perfluorocompound, comprising:

(a) a first water scrubber for washing with water an exhaust gas containing a perfluorocarbon or a perfluorocompound discharged from manufacturing equipment;

(b) a gas decomposer-burner tower having:

a gas decomposer room connected to an upper end of the first water scrubber for mixing at least one of a hydrocarbon gas and $NH_3$ gas with the exhaust gas washed by the first water scrubber and thermally decomposing a resulting mixed gas in a non-oxidizing atmosphere;

a burner room for burning flammable components of the mixed gas thermally decomposed in the gas decomposer room; the gas decomposer room and the burner room being formed integrally with each other and situated across an intervening heat-resistant partition wall having an opening at an upper end portion thereof for providing communication between the gas decomposer room and the burner room;

(c) a heater horizontally disposed in the gas decomposer room and the burner room;

(d) a grating horizontally disposed below the heater in the gas decomposer room and the burner room;

(f) a pipe for supplying a reducing atmosphere forming agent to the gas decomposer room;

(g) an air-feeding pipe for supplying air to the burner room;

(f) an adsorber tower disposed downstream of the gas decomposer-burner tower and loaded with granular CaO or $CaCO_3$; and (g) a water cistern on which the first scrubber stands.

* * * * *